United States Patent [19]

Elter et al.

[11] 4,381,282
[45] Apr. 26, 1983

[54] RADIATION SHIELD AND SHIELDED GAS CONDUIT FOR A REACTOR PRESSURE VESSEL

[75] Inventors: Claus Elter, Bad Duerkheim; Hans-Juergen Kolodzey, Ketsch; Josef Schoening, Hambruecken; Hans-Georg Schwiers, Kietsch; Wilfried Stracke, Oftersheim, all of Fed. Rep. of Germany

[73] Assignee: Hochtemperatur-Reaktorbau GmbH, Cologne, Fed. Rep. of Germany

[21] Appl. No.: 177,494

[22] Filed: Aug. 12, 1980

[30] Foreign Application Priority Data

Aug. 22, 1979 [DE] Fed. Rep. of Germany ....... 2933899

[51] Int. Cl.³ .............................................. G21C 9/00
[52] U.S. Cl. .................................. 376/292; 376/389; 376/393
[58] Field of Search ..................... 76/60, 84, DIG. 2; 250/506, 507, 517, 518; 376/292, 389, 393

[56] References Cited

U.S. PATENT DOCUMENTS

| 3,009,866 | 11/1961 | Fraas et al. | 176/DIG. 2 |
| 3,086,931 | 4/1963 | Long et al. | 176/DIG. 2 |
| 3,249,508 | 5/1966 | Rachais | 176/60 X |
| 4,175,001 | 11/1979 | Haferkamp et al. | 176/60 |
| 4,234,384 | 11/1980 | Fritz et al. | 176/84 X |
| 4,278,892 | 7/1981 | Baatz et al. | 250/506 |

FOREIGN PATENT DOCUMENTS

| 1353257 | 3/1963 | France | 176/DIG.2 |
| 1035134 | 7/1966 | United Kingdom | 176/DIG. 2 |

*Primary Examiner*—Peter A. Nelson
*Attorney, Agent, or Firm*—Schwartz, Jeffery, Schwaab, Mack, Blumenthal & Koch

[57] ABSTRACT

An improved design for shielding the component parts of a gas turbine power plant from radiation in a gas transport conduit is disclosed. The radiation shield and shielded gas conduit utilize a shielding arrangement comprising a displacement body arranged centrally within the conduit and a shielding annulus surrounding the displacement body. A shielding device provides for a first annular flow path for reactor cooling gas between the displacement body and shielding annulus and a second annular flow path for reactor cooling gas between the shielding annulus and the conduit housing. The shielding device provides protection against radiation without significantly disrupting the flow of the cooling gas in the conduits.

4 Claims, 1 Drawing Figure

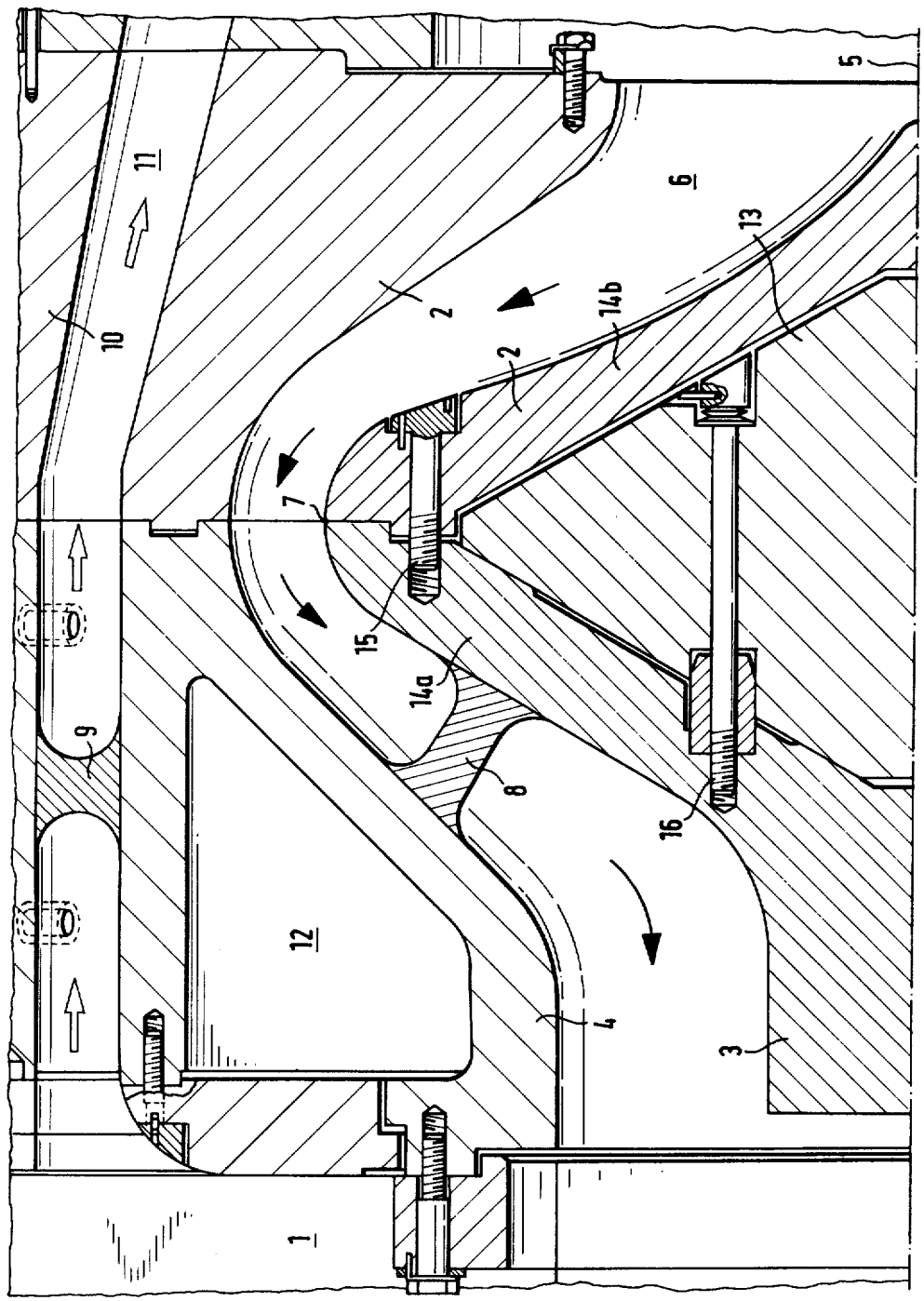

RADIATION SHIELD AND SHIELDED GAS CONDUIT FOR A REACTOR PRESSURE VESSEL

BACKGROUND OF THE INVENTION

1. Field of the Invention

The invention concerns a radiation shield and shielding gas conduit installed in a reactor pressure vessel between the individual components of the cooling gas circuit of the reactor. The radiation shield is removably installed within the reactor pressure vessel, more particularly in the gas conduits. The gas conduits are designed as coaxial gas conduits for the conduction of cooling gas in both directions.

2. Background of the Prior Art

It is part of the state of the art to separate by means of shielding devices the portion of the gas cooled reactor installation containing the reactor core from the portion containing components of the cooling gas circuit, such as, for example, steam generators and blowers, when both portions are housed together in the cavities of a pressure vessel. In this fashion activation of these components by direct neutron irradiation is prevented. The shielding structure must be specifically laid out so that the cooling gas will be able to flow without a substantial drop in pressure from the reactor core to the other reactor components, while preventing the passage of harmful radiation through the free cross section of the gas conduits connecting the reactor core with the reactor components.

West German Published Application No. 1 083 945 describes a reactor core shield having a cylindrical internal member and an external shielding ring, forming an S-shaped flow path of the cooling gas together with a further shielding ring. This shielding involves a high expenditure of material.

Another approach to the shielding problem that has become well known is to bend the gas conduits by 90° after their passage through a shielding wall, i.e. to use angled gas conduits. This is the case for example in the THTR-300 MWe reactor and in the gas turbine power plant design of U.S. Pat. No. 4,175,001 wherein the gas heated in the reactor core is collected in a hot gas collector space and passed through a gas conduit each to the steam generators. The gas conduits for example may initially pass through a thermal shield in the horizontal direction and are then bent upward by 90°, so that they may be connected with the jacket of one of the steam generators.

West German Offenlegungsschrift No. 1 464 705 further describes a tubular conduit shielded against radiation immediately adjacent the reactor core. In the area of the passage through the pressure vessel of the reactor, the conduit has an expansion with a shielding block installed therein. This block has a diameter at least as large as the cross section of the conduit generally (except in the area of the block) and the flow of gas or liquid is conducted around the shielding block. This type of shielding has the disadvantage that the conduit must have a diameter that is larger in the area of the shielding block than the diameter of the conduit generally.

When the gas conduit is part of a nuclear reactor installation wherein the components of the cooling gas circuit are arranged in the recesses of a reinforced concrete pressure vessel, the components must be protected to the highest degree possible against activation by direct neutron irradiation.

In addition, the components must be readily accessible for the purposes of inspection, maintenance, repair and removal. This is particularly true for hot gas conduits connecting the hot gas collector space with components of the gas transport conduit, for example, gas turbines or heat exchangers. In order to prevent the activation of the metallic parts of these hot gas conduits, West German Offenlegungsschrift No. 25 06 293 proposes to provide shielding in the form of an annular wall in the hot gas collector space over its entire height, the wall being arranged coaxially with respect to the reactor cavity and having several rows of slits for the passage of the cooling gas.

SUMMARY OF THE INVENTION

The present invention is based on this state of the art and provides an arrangement of coaxial gas conduits that prevent excessive activation of the components of the cooling gas circuit by radiation from the reactor core. At the same time the components are accessible for maintenance, repair and replacement. This radiation shielding is provided without causing excessive loss of pressure in the flow of the cooling gas.

The objects and advantages of the present invention are obtained by providing a radiation shield for a coaxial gas conduit of a reactor pressure vessel comprising a displacement body of a symmetrical shape about an axis of rotation and a shielding annulus surrounding the displacement body at a distance to define a first annular flow path for reactor cooling gas. The shielding annulus is mounted within the conduit structure in such a manner that a second annular flow path for the reactor cooling gas is formed between the shielding annulus and the inner side of the conduit housing or a sleeve arrangement tightly fitted against the inner surface of the conduit housing.

In addition, the shielding annulus also displays an inner surface conforming substantially to the contour of the displacement body. Thus, the first annular flow path for reactor cooling gas extends along the outside surface of the displacement body which is centrally arranged within the coaxial gas conduit, preferably with the aforementioned axis of rotation also coinciding with the longitudinal axis of the gas conduit itself. The radiation shield therefore provides a path for the smooth flow of cooling gas in the first annular flow path in one direction as well as the smooth flow of reactor cooling gas in the second annular flow path.

The invention also concerns the shielded gas conduit arrangement itself wherein the radiation shield as defined above is removably fastened within a conduit housing in the reactor pressure vessel. A plurality of such radiation shields, of course, may be employed in the overall nuclear reactor power plant installation.

The design of the gas conduit according to the invention serves to shield the components exposed to the flow of the cooling gas, for example, cooling gas blowers, against neutron irradiation. In this fashion activation and embrittlement of the materials making the components are prevented. Furthermore, the shielding makes it possible to remove the components with a lesser effort for radiation protection than would be required in conventional conduits.

The special configuration of the displacement body and the shielding annulus surrounding it makes it possible to keep the flow losses of the cooling gas low enough so that they may be considered as negligible.

Optimum effects of the shielding are obtained by adapting the materials used to the prevailing conditions of flow. In order to simultaneously also achieve a highly economical arrangement, the displacement body advantageously comprises an inner part and an outer part surrounding the inner part on all sides. The two parts are preferably made of different materials. For example, the inner part of the displacement body may be made of graphite and the outer part of gray cast iron. The installation of a displacement body of this type substantially reduces the flow of thermal neutrons in the gas conduit.

In another embodiment of the invention the manufacture of the displacement body is facilitated by designing the outer part made of gray cast iron comprising two structural elements joined together in a releasable manner. The two structural elements may, for example, be bolted together.

The inner part of the displacement body preferably made of graphite, may be releasably fastened to one of the two cast iron parts. Here again, a threaded bolt connection is preferably used.

Advantageously, the conditions of flow in the gas conduit are also taken into consideration in the selection of materials for the shielding annulus. Thus the shielding annulus may also be made of cast iron. In order to save material and weight, the shielding annulus may be hollow in part, that is, it may contain a cavity in its area located behind the deflecting location in the direction of the flow of the cooling gas flowing on the first path of flow.

According to the invention, the shielding annulus is supported on the internal wall of the gas conduit. This may be effected by fastening the shielding annulus by means of a plurality of holding elements to the inner wall of the gas conduit. It is also possible, however to insert a sleeve, preferably, made of cast iron, into the inner wall of the gas conduit and to attach the shielding annulus by means of the holding elements to this sleeve. The second annular flow path is then provided between the sleeve and the shielding annulus.

BRIEF DESCRIPTION OF THE DRAWING

In the drawing, a partial section of the gas conduit is schematically presented. The FIGURE shows a longitudinal section through a portion of the conduit wherein only the upper part of the gas conduit may be seen to its center axis. Thus the top half of the radiation shield arrangement of the present invention is demonstrated. The lower half comprises a mirror image of the FIGURE as shown.

DETAILED DESCRIPTION OF THE PREFERRED EMBODIMENT

The drawing shows a gas conduit 1, representing part of a nuclear reactor installation of integral structural design; i.e. in the reactor pressure vessel. In addition to the nuclear reactor, the heat exchange apparatus and the cooling gas blowers are also housed in the pressure vessel (not shown). The gas conduit 1 connects for example the individual components of the cooling gas circuit with each other. The components (not shown) are installed removably in the reactor pressure vessel. In order to keep the radiation protection effort during the replacement of the components within economically reasonable limits the components must be shielded from the radiation. A radiation shield is, therefore built into the gas conduit 1.

The radiation shield is intended to provide adequate protection against radiation but must not cause excessive pressure losses in the flow of the cooling gas.

The gas conduit 1 is actually designed in the form of a coaxial conduit wherein one conduit serves to conduct the cooling gas to one component and the other conduit serves to conduct the gas away from the same component.

The radiation shield comprises a displacement body 3 built centrally into the gas conduit 1 and a shielding annulus 2 and 4 surrounding the displacement body 3. The displacement body 3 has a rotation symmetrical form, wherein its fictitious axis of rotation 5 coincides with the longitudinal axis of the gas conduit 1. The internal surface of the shielding annulus 4 is adapted to the contour of the displacement body 3 whereby an annular flow path 6 is formed between the two structural parts. The flow path has a deflecting location 7 for the cooling gas.

Displacement body 3 is maintained in position by means of a series of mounting elements 8 supported on the shielding annulus 4. The shielding annulus 4 in turn is supported by means of a plurality of holding elements 9 on a sleeve 10 which is inserted in the area of the shielding annulus 4 in the internal wall of the gas conduit 1. Between the shielding annulus 2, 4 and the sleeve 10 another annular flow path 11 is provided. In an alternate embodiment the sleeve 10 is not employed and the shielding annulus 2, 4 is removably fastened to the gas conduit housing itself.

Sleeve 10 and shielding annulus 2, 4 are made of gray cast iron. In order to save weight, the shielding annulus 4 has a cavity 12.

In the flow path 6 the cooling gas, coming for example from a steam generator, is conducted in the direction indicated by the arrows toward a cooling gas blower. Following compression in the cooling gas blower (not shown), the cooling gas flows in the opposite direction (as indicated by arrows) back to the nuclear reactor along flow path 12.

The cavity 12 of the shielding annulus 4 is located in the area located behind (as viewed in the direction of flow of the cooling gas) the deflection 7 placed in the flow path 6.

The displacement body 3 preferably comprises an inner part 13, made of graphite, and an outer part 14 made of cast iron and surrounding the inner part 13 on all sides. The outer part 14 is assembled of two structural elements 14a and 14b, which are bolted together by means of the threaded bolts 15. The inner part 13 is fastened to the structural element 14a, again by means of threaded bolts 16.

The shielding annulus 2, 4 may also be combined of several parts, for ease of manufacture.

One or more of the radiation shields and shielded gas conduits as illustrated are arranged in the gas transport system of a high temperature power plant installation. The power plant installation may comprise many forms and arrangements particularly suitable for improvement by the present invention. One such power plant installation is disclosed in U.S. Pat. No. 4,175,001 and the disclosure of this patent is hereby incorporated by reference. The coaxial conduits also may be constructed of various forms and arrangements. Particular reference is made to the disclosure of a coaxial conduit system in U.S. Pat. No. 4,118,276, the disclosure of which is also incorporated herein by reference.

The specification and drawings set forth the preferred embodiments of the invention. It should be noted, however, that the invention is not limited to those specific embodiments and methods specifically disclosed, but extends to all embodiments, substitute and equivalent constructions falling within the scope of the invention as defined by the claims.

We claim:

1. A shielded gas conduit for a reactor pressure vessel comprising:
   a conduit housing forming a passageway for cooling gas, said passageway comprising two separate coaxially arranged conduits with cooling gas flowing in one direction in the outer conduit and cooling gas flowing in the opposite direction in the inner conduit;
   a displacement body arranged centrally within said housing and having a symmetrical shape about an axis of rotation coinciding with the longitudinal axis of said conduit housing;
   a shielding annulus surrounding said displacement body at a distance to define a first annular flow path for reactor cooling gas communicating with said inner conduit within said conduit housing, said shielding annulus having an inner surface substantially following the contour of the said displacement body and a cavity area located behind the deflection in the direction of the cooling gas flowing along said inner conduit;
   means for mounting said shielding annulus within said conduit housing, said means and the outer surface of said shielding annulus defining a second annular flow path for reactor cooling gas communicating with said outer conduit; and
   a plurality of mounting elements fixedly securing said displacement body to said shielding annulus.

2. A shielded gas conduit for a reactor pressure vessel comprising:
   a conduit housing forming a passageway for cooling gas, said passageway comprising two separate coaxially arranged conduits with cooling gas flowing in one direction in the outer conduit and cooling gas flowing in the opposite direction in the inner conduit;
   a displacement body comprising an inner part and an outer part surrounding said inner part on all sides and wherein said inner and outer parts are made of different materials and said outer part is comprised of two releasably joined structural elements arranged centrally within said housing and having a symmetrical shape about an axis of rotation coinciding with the longitudinal axis of said conduit housing;
   a shielding annulus surrounding said displacement body at a distance to define a first annular flow path for reactor cooling gas communicating with said inner conduit within said conduit housing, said shielding annulus having an inner surface substantially following the contour of the said displacement body;
   means for mounting said shielding annulus within said conduit housing, said means and the outer surface of said shielding annulus defining a second annular flow path for reactor cooling gas communicating with said outer conduit; and
   a plurality of mounting elements fixedly securing said displacement body to said shielding annulus.

3. A shielded gas conduit for a reactor pressure vessel comprising:
   a conduit housing forming a passageway for cooling gas, said passageway comprising two separate coaxially arranged conduits with cooling gas flowing in one direction in the outer conduit and cooling gas flowing in the opposite direction in the inner conduit;
   a displacement body comprising an inner part and an outer part surrounding said inner part on all sides and wherein said inner and outer parts are made of different materials and said inner part of the displacement body is releasably fastened to said outer part arranged centrally within said housing and having a symmetrical shape about an axis of rotation coinciding with the longitudinal axis of said conduit housing;
   a shielding annulus surrounding said displacement body at a distance to define a first annular flow path for reactor cooling gas communicating with said inner conduit within said conduit housing, said shielding annulus having an inner surface substantially following the contour of the said displacement body;
   means for mounting said shielding annulus within said conduit housing, said means and the outer surface of said shielding annulus defining a second annular flow path for reactor cooling gas communicating with said outer conduit; and
   a plurality of mounting elements fixedly securing said displacement body to said shielding annulus.

4. The shielded gas conduit of claim 2, wherein said inner part of the displacement body is releasably fastened to said outer part.

* * * * *